May 16, 1961
R. C. BOUGHTON
2,984,504
PIPE JOINT INCLUDING CLAMPING RING THEREFOR
Filed June 18, 1957
2 Sheets-Sheet 1
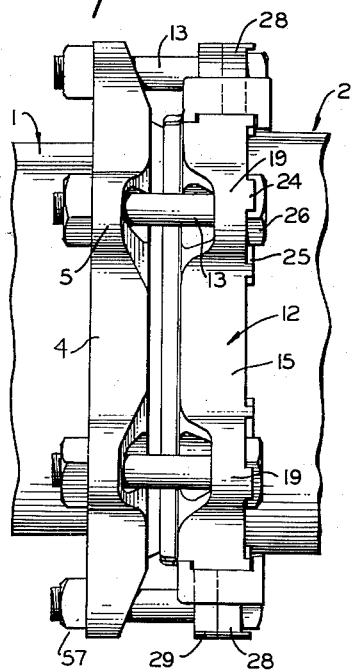
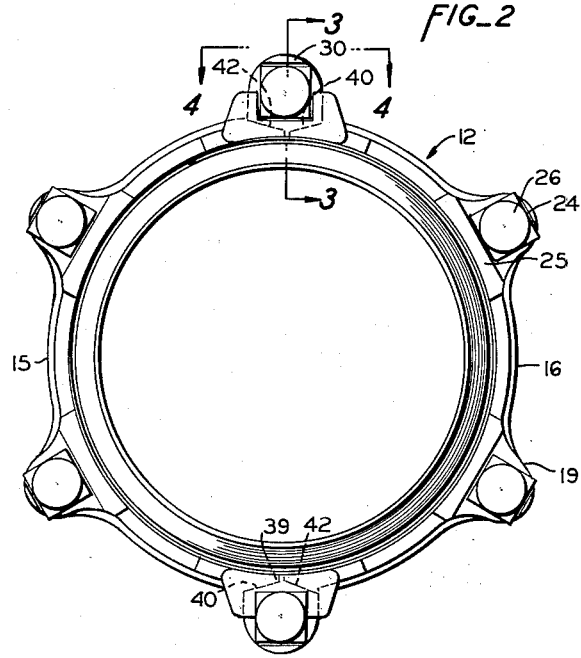
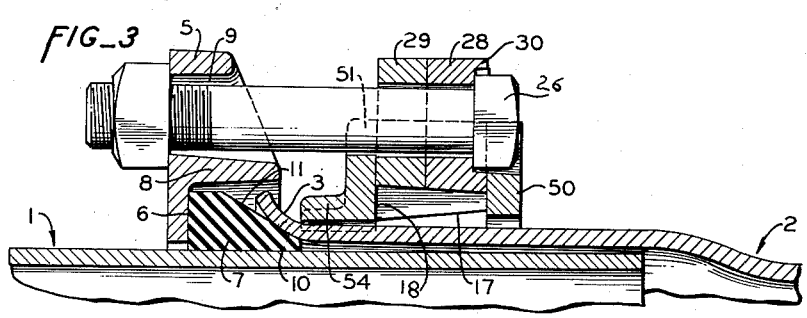
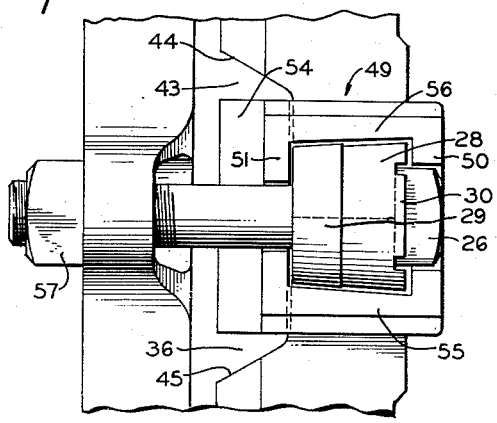
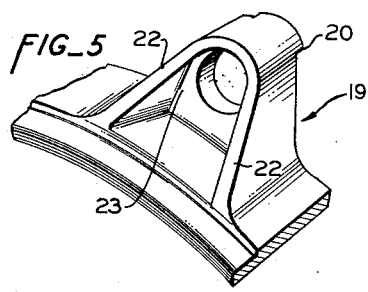
INVENTOR.
ROGER C. BOUGHTON
BY
ATTORNEYS

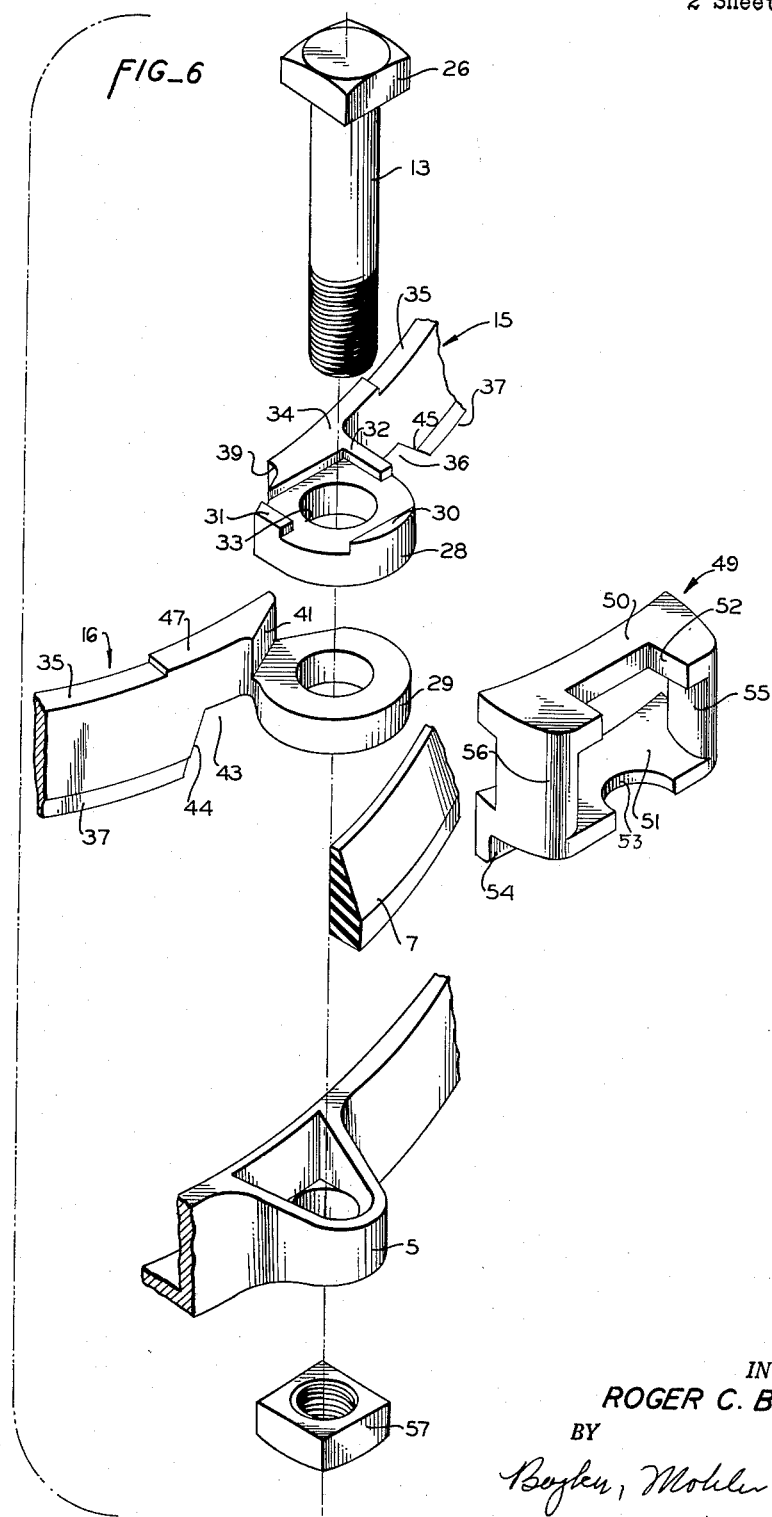

United States Patent Office 2,984,504
Patented May 16, 1961

2,984,504
PIPE JOINT INCLUDING CLAMPING RING THEREFOR

Roger C. Boughton, Alhambra, Calif., assignor to Joslyn Mfg. & Supply Co., Chicago, Ill., a corporation of Illinois Filed June 18, 1957, Ser. No. 666,339

6 Claims. (Cl. 285—337)

This invention relates to a pipe joint incorporating a clamping ring that is formed in circumferentially extending sections, and has for one of its objects the provision of improved means for releasably securing said sections together against circumferential and axial separation and also against angular movement of adjacent sections relative to each other out of the plane of said ring.

Another object is the provision of a sectional bell ring for use in a bell and spigot pipe joint and improved means for releasably securing the sections for the bell ring together without creating a weakness in the ring at the junctures between the separate sections and which means cooperates with the clamping bolts for retaining said means in position and for increasing the rigidity of the clamping ring.

Heretofore, and as disclosed in my United States Letters Patent No. 2,679,410, issued May 25, 1954, means in the form of bell engaging members that are spaced apart and that are entirely separate from each other have been provided for engaging the bell of a bell and spigot joint at spaced points, and these members have necessarily been in frictional engagement with the spigot ring in order to properly hold them against the bell when the bolts connecting them with the spigot ring were tightened.

With the above arrangement, very high frictional resistance between the bell engaging members and the spigot ring resulted in only a fractional part of the force applied to said members reaching the sealing gasket, yet virtually the sole purpose of the structure was to force the gasket into a tight seam sealing position.

Furthermore, where spaced clamping members engage the bell, the localized stress on the bell at the points of engagement between such members and the bell tends to distort or to deform the bell, hence it has been customary to use bells of much higher gauge metal than would otherwise be required in order to withstand the tendency toward deformation.

With the present invention, the above objections are overcome in a simple and economical manner and the provision of means for overcoming said objections is an object of the invention.

An additional object is the combination of a bell and spigot ring in sizes requiring a sectional bell ring in which virtually all the force applied to the clamping members for effecting the sealing of the seam at the joint is transmitted directly to the gasket that effects the seal.

Other objects and advantages will appear in the description and in the drawings.

In the drawings,

Fig. 1 is a side elevational view of an assembled bell and spigot pipe joint.

Fig. 2 is an elevational view of the assembly taken from the bell ring side with the pipe carrying the bell ring shown in cross section.

Fig. 3 is an enlarged cross-sectional view taken along line 3—3 of Fig. 2.

Fig. 4 is a fragmentary top plan view of the portion shown in Fig. 3.

Fig. 5 is a fragmentary perspective view of one of the bolt receiving portions on each of the bell ring sections intermediate the end portions of said section, as seen from the side of the section that faces toward the spigot ring.

Fig. 6 is an exploded view of the portions of the bell ring at one of the points of connection between an adjacent pair of sections of such ring showing the means for securing said sections together. The pipe lengths themselves are not shown in Fig. 6.

In details, one pipe is generally designated 1 (Figs. 1, 3) and the other pipe is designated 2. The spigot end of pipe 1 is indicated (Fig. 3) as being straight, and extending into the bell end of pipe 2. The bell end of pipe 2 is flared outwardly at 3, and in this description and claims, the term "bell" will refer to this flared end. As seen in Fig. 3, the entire end of pipe 2 into which the pipe 1 extends may be enlarged so that pipe 1 can extend into pipe 2 only as far as the enlargement may extend, but the pipe 2 could be of a larger diameter its full length, if desired, with merely the flared end 3 being provided.

The spigot ring 4 is shown as being a single ring formed with radially outwardly projecting apertured bolt receiving lugs 5. This ring is formed with a flat axially facing surface 6 adapted to engage the correspondingly flat axially facing surface of the seam sealing gasket 7, and an axially directed annular flange 8 integral with ring 4 extends over said gasket 7. The lugs 5 extend radially outwardly of the flange 8 and are each provided with a bolt receiving aperture 9.

The gasket 7 is formed with an annular radially inwardly facing surface 10 adapted to engage the cylindrical outer surface of the spigot end of pipe 1, and the side of the gasket opposite to the side engaging the surface 6 is tapered at 11 to engage the radially inner surface of the flared end or bell 3 of the pipe 2.

This gasket 7 is to be tightly forced axially of the pipe 1 into tight engagement with the bell 3, and consequently into tight sealing engagement with the spigot end of pipe 1, in order to seal the seam between the spigot and bell ends of pipes 1, 2, and the means herein provided for so moving the gasket includes a sectional bell ring, generally designated 12 (Figs. 1, 2) and bolts 13 that connect the spigot ring with the bell ring.

The bell ring may be made in two or more circumferentially extending sections, according to the size. The ring illustrated, for example, has an inside diameter of between six and seven inches and is formed in two equal length sections 15, 16.

Each of the bell ring sections has a radially inwardly facing surface 17 that faces the pipe 2, and along the axially facing edge 18 of each section and between the end portions of each section, are radially outwardly projecting axially apertured bolt receiving portions 19, that have the same circumferential spacing as the lugs 5, and the apertures 20 in portions 19 are adapted to be in axial alignment with similar apertures 9 in lugs 5, so that bolts 13 will extend substantially parallel with the axis of the rings 4, 12 when said bolts extend through apertures 9, 20. The edge 18 of the bell ring sections is the one that is directed away from the spigot ring when the spigot and bell rings are on pipes 1, 2.

The radially outwardly projecting bolt receiving portions 19 are substantially of U-shape with the outer ends of the U integrally connected with the bell ring section and with the sides 22 (Fig. 5) in the plane of the bell ring. Said sides or legs of the U extend convergently outwardly relative to the ring section and are of about the width of the ring section where they connect with the ring section. This width progressively decreases in direction radially outwardly of the ring section due to slanting the edges of said sides 22 that generally face the spigot ring.

A web 23 closes the side of each portion 19 that is along the edge of the ring section remote from the spigot ring, and this web has the bolt receiving aperture 20 therein.

The upper side of each aperture 20 is flush with the inside surface of each U portion 19 at the bend. Thus a bolt extending through each aperture 19 will engage the radially inwardly facing surface of each portion 19 which is of substantially greater axial width than the thickness of web 23. This provides a relatively wide bearing surface for each bolt to resist any tendency of the bell ring sections to tilt relative to the axis of the pipe when the bolts 13 are tightened.

The sides of the webs 23 that are directed away from the spigot ring are each formed with radially (relative to the axis of the bell ring) spaced ribs or projections 24, 25 (Fig. 2) respectively positioned at opposite sides of the aperture 20. These projections have parallel elongated opposed sides that are adapted to approximately engage the opposite outer sides of the bolt head 26 of the bolt 13, to thereby prevent rotation of the bolt 13 when the head 26 is between projections 24, 25.

Referring now to the ends of sections 15, 16, said ends are different on the same section, but the sections are identical. Thus, the same mold will produce the several sections.

In Fig. 1 the near bell ring section 15 is shown with its ends at the top and at the bottom of the view with the spigot ring to the left of the bell ring.

Along the edge of section 15 that is remote from the spigot ring, said section is formed with a radially outwardly projecting axially apertured bolt receiving portion 28. This portion is indicated in dotted line where it passes through a collar or link later to be described more in detail.

At the lower end of section 15 as seen in Fig. 1 is a similar radially outwardly projecting axially apertured bolt receiving portion 29, which is indicated in dotted line where it passes through a collar identical with the one above mentioned.

The sections 15, 16 being identical, the same numerals will be used in identifying the specific structure of the sections.

As seen in Figs. 1 and 6, the bolt receiving portion 29 is offset relative to portion 28 in a direction toward the spigot ring side of the section a distance substantially equal to the axial thickness of the portion 28.

This portion 28 on each section is formed on its axially facing side that is directed away from the spigot ring with a projection 30 that corresponds with each of the projections 24 and parallel opposed, elongated projections or ridges 31, 32 (Fig. 6) extending at right angles to the length of projection 30 are at two of the opposite sides of the aperture 33 in each portion 28 while projection 34, in opposed relation to the projection 30, is in opposed relation to the latter at the other side of aperture 33 from projection 30. This latter projection preferably connects with one end of the projection or ridge 32 and extends along the face of the edge 35 of the section 15 in direction toward the other end of the section a distance substantially equal to the length of an outwardly opening recess 36 formed in the other edge 37 of the section 15. These projections 30, 31, 32 and 34 are of substantially the same depth and are of approximately the same depth (axially of the section) as the projections 24, 25 that are on the bolt receiving portions 19. They function to hold the bolt heads 26 against rotation, although the projection 34 also functions as a reinforcement for the section 15.

The axially inwardly facing sides of the sections below each portion 28 is formed with a circumferentially facing shoulder 39 (Figs. 2, 6) disposed on substantially a radial line extending from the center of the bell ring and extending through the center of the aperture 33, which shoulder connects with a flat surface 40 extending slantingly outwardly relative to the axis of the bell ring to the end of the section 15 adjacent thereto. This slanted surface 40 is indicated in dotted line at the upper and lower portions of the bell ring as seen in Fig. 2, and the shoulder 39 is also indicated.

The section 16 is formed with a similarly inclined generally radially outwardly facing flat surface 41 (Fig. 6) at one side of the portion 29. These surfaces 40, 41 are in opposed substantially engaging relation where the bolt receiving portions 28, 29 at adjacent ends of sections 15, 16 are in axially lapping relation with the apertures in said portions coaxial.

The underside of the portion 29 is formed with a slanted surface 42 (Fig. 2) that is similar to the surface 40, but at a slant opposite to that of surface 40, and the portion of section 15 alongside the bolt receiving portion 28 is formed with a slanted surface in parallel opposed relation to surface 42. This slanted surface alongside the portion 28 is similar to the surface 41 except that it is slanted oppositely to surface 41.

By the foregoing structure, when the portions 28, 29 are in laterally lapping relation, the slanted, but generally radially facing surfaces below and alongside the portions 28, 29, are in radially lapping relation, and the shoulders 39 form an abutment for the end of the section 16.

As has already been noted the section 15 is recessed at 36 at its end that is adjacent to the end of section 16 (Figs. 4, 6) and as seen in the same views it will be seen that at 43 the section 16 is similarly recessed. The bottom of these recesses are flush with the axially facing side of the portion 29 that faces the spigot ring, and the sides 44, 45 extend divergently outwardly from the ends of said bottom (Fig. 4).

The rib or projection 34 (Fig. 6) has been mentioned as reinforcing the end of section 15 opposite to the recess 36 and in Fig. 4, it will be seen that a corresponding axial extension 47 reinforces the end of section 16 opposite to the recess 43.

In assembling the bell ring, the end bolt receiving portions 28 will be in lapping relation to the bolt receiving portions 29 at the sides of the latter that face away from the spigot ring. By this structure the portion 29 at the end of each section opposite to the portion 28 will be on the spigot side of the portion 28 that is in lapping relation thereto. Since the bolt head always engages the portion 28 at the juncture between adjacent sections, the force transmitted by the bolt extending through each of the pairs of lapping portions 28, 29 will always be transmitted to the one that is remote from the spigot ring and from that portion to the one lapped thereby.

The sections 15, 16 are held together by a collar 49 that encloses each lapping pair of portions 28, 29. This collar may be generally rectangular (Fig. 6) having two opposed sides 50, 51. The side 50 is adapted to extend across the axially outwardly facing side of the bolt receiving portion 28 between the bolt head 26 and the pipe 2 and it is formed with a rectangular radially outwardly opening recess 52 adapted to receive the square bolt head 26 to prevent turning of the latter.

The side 51 of the collar is adapted to extend across the axially facing side of the portion 29 that is adapted to face the spigot ring. This side 51 is centrally formed with a radially outwardly opening semicircular recess 53 for receiving the bolt 13.

Also said side 51 is formed with an extension that extends into the gap that is formed by the combined recesses 36, 43 to substantially fill the latter, and an axially projecting flange 54 along the portion extending into said recess projects axially outwardly of side 51 a sufficient distance so that its outer edge is flush or even with the edges 37 of the sections 15, 16.

The other two sides 55, 56 of each collar are identical and are adapted to extend across the junctures between portions 28, 29.

In order to assemble the joint, the spigot ring is first placed on the spigot end of pipe 1 with its flange 8 projecting axially of the pipe generally toward the end of the latter adjacent thereto so that the side 6 of the flange will engage the gasket 7. The gasket is then placed on the spigot end of pipe 1 with its slanted side 11 positioned to engage the slanted inner surface of the bell 3.

The spigot end of the pipe may then be inserted into the bell end of pipe 2, and the sections 15, 16 are then placed on the bell end of pipe 2 with the portions 28, 29 in lapping relation and with each of the portions 28 always at the side of the portion 29 that is remote from the spigot ring.

The links or collars 49 are then slipped over the pairs of lapped portions 28, 29 so that the flange 54 on each side 51 extends into the gap between the opposite sides 44, 45 of the recess adjacent to portion 29 to bridge said gap.

When the collar is in position enclosing portions 28, 29 the sections 15, 16 virtually become a rigid single ring, but separable at the lapped portions 28, 29 into separate sections 15, 16 when the collars are removed.

The bolts 13 are then inserted into the aligned bolt openings in lugs 5, portions 19 and 28, 29 with the heads of the bolts against the sides of portions 19, 28 that are remote from the spigot ring.

The nuts 57 are then placed on the threaded ends of the bolts that project from the lugs 5 of the spigot ring, and upon tightening the nuts, the spigot ring and bell ring will move toward each other until the edge 34 of the bell ring and the outer edges of the flanges 54 on the collars 49 engage the bell 3, and thereafter the spigot ring will move relative to the bell ring to tightly force the gasket into seam sealing relation to bell 3 and pipe 1. Once the bell ring is in engagement with the bell during a tightening operation, all of the force resulting from tightening the nuts 57 will be applied to the gasket through the spigot ring. There is no loss due to frictional resistance between any portion of the bell ring and the spigot ring. Furthermore, the bell ring may engage the bell 3 with equal pressure at all points around the bell ring, or at least the pressure will be distributed around the bell, rather than at localized points, so that no deformation of the bell can occur at any localized point. This enables the bell to be of lighter gauge material than where localized pressure is applied to the bell at spaced points around the latter.

I claim:

1. In a pipe coupling of the type having a sealing gasket and bolts extending axially of the pipe around the gasket for engagement with a clamping ring to move said ring axially of the pipe for placing the gasket under compression; a clamping ring comprising a plurality of separable circumferentially extending sections each having radially outwardly projecting portions at opposite ends thereof, the adjacent pairs of said portions at adjacent ends of said sections being in lapping relation and each pair of lapping portions being formed with axially aligned bolt openings, and means separable from each of said pairs of lapping portions closely encircling the latter for releasably securing them together against separation in directions axially and circumferentially of said ring, the radially inwardly facing surface of said ring being substantially annular and unbroken circumferentially of the ring when said means is around each lapping pair of said portions, and a part of each of said means extending across the junctures between the adjacent ends of adjacent sections of said ring to bridge said junctures, said part of each of said means having a radially inwardly facing surface concentric with the axis of said ring and in continuation of the inner annular surface of said ring.

2. In a pipe coupling of the type having a sealing gasket and bolts extending axially of the pipe around the gasket for engagement with a clamping ring to move said ring axially of the pipe for placing the gasket under compression; a clamping ring comprising a plurality of separable circumferentially extending sections each having radially outwardly projecting portions at opposite ends thereof, the adjacent pairs of said portions at adjacent ends of said sections being in lapping relation and each pair of lapping portions being formed with axially aligned bolt openings, and means separable from each of said pairs of lapping portions closely encircling the latter for releasably securing them together against separation in directions axially and circumferentially of said ring, the radially inwardly facing surface of said ring being substantially annular and unbroken circumferentially of the ring when said means is around each lapping pair of said portions, and a part of each of said means extending across the junctures between the adjacent ends of adjacent sections of said ring to bridge said junctures, said part of each of said means having a radially inwardly facing surface concentric with the axis of said ring and in continuation of the inner annular surface of said ring, said means each being a substantially rectangular collar having one side extending across one of the axially facing sides of the pair of said portions enclosed by said means, and the axially outwardly facing surface of said one side being substantially flush with one of the axially facing sides of said ring.

3. Clamping means for the seam closing gasket at the bell and spigot ends of pipe comprising: a bell ring adapted to encircle the bell end of a pipe and to engage the generally radially outwardly facing side of the bell at said end, said bell ring being formed in separable circumferentially extending sections in substantially end to end relation, radially outwardly projecting end portions on the adjacent ends of adjacent sections in axially lapping relation, axially aligned bolt openings formed in the lapped portions and said lapped portions being offset axially of one side of said ring providing a gap along said one side only between said adjacent ends, a collar enclosing said lapped portions at each of said adjacent ends between said openings and said ring, each collar having a radially inwardly projecting extension filling said gap.

4. Clamping means for the seam closing gasket at the bell and spigot ends of pipe comprising: a bell ring adapted to encircle the bell end of a pipe and to engage the generally radially outwardly facing side of the bell at said end, said bell ring being formed in separable circumferentially extending sections in substantially end to end relation, radially outwardly projecting end portions on the adjacent ends of adjacent sections in axially lapping relation, axially aligned bolt openings formed in the lapped portions and said lapped portions being offset axially of one side of said ring providing a gap along said one side only between said adjacent ends, a collar enclosing said lapped portions at each of said adjacent ends between said openings and said ring, each collar having a radially inwardly projecting extension filling said gap, one side of each collar extending across the axially outwardly facing side of one of each lapped portion that is along the side of the ring opposite to each gap being formed with a radially outwardly opening recess for relatively closely receiving the polysided head of a bolt adapted to extend through the aligned bolt openings in said lapped portions to prevent rotation of such bolt.

5. Clamping means for the seam closing gasket at the bell and spigot ends of pipe comprising: a bell ring adapted to encircle the bell end of a pipe and to engage the generally radially outwardly facing side of the bell at said end, said bell ring being formed in separable circumferentially extending sections in substantially end to end relation, radially outwardly projecting end portions on the adjacent ends of adjacent sections in axially lapping relation, axially aligned bolt openings formed in the lapped portions and said lapped portions being offset axially of one side of said ring providing a gap along said one side only between said adjacent ends, a collar enclosing said lapped portions at each of said adjacent ends between said openings and said ring, each collar having a radially inwardly projecting extension filling said gap, and a similar radially projecting extension on said collar in opposed relation to the one filling said gap, the radially inwardly facing edges of said extensions being curved longitudinally to conform to the curvature of the radially inwardly facing surface of said ring and said inwardly facing edges being substantially flush with the radially inwardly facing surface of the ring.

6. A clamping ring adapted to be removably supported on the bell end of a pipe in engagement with the bell on the latter comprising: a plurality of circumferentially extending separable sections in generally end to end relation, each having a radially outwardly projecting axially apertured bolt receiving portion at each end thereof, the adjacent portions at the ends of each adjacent pair of sections being in axially lapping relation and one of the said adjacent portions being in radially lapping relation to part of the adjacent section, means separable from said sections and said portions releasably securing the lapping portions of said sections against separation axially and radially of the ring, axially outwardly opening spaced recesses formed in a lateral side of said ring with half of each recess in direction circumferentially of the ring being formed in the adjacent ends of each adjacent pair of sections, an extension on said means extending into each of said recesses and extending circumferentially of the ring substantially between the opposite sides of each recess.

References Cited in the file of this patent

UNITED STATES PATENTS

| | | |
|---|---|---|
| 406,888 | Davis | July 16, 1889 |
| 961,987 | Rust | June 21, 1910 |
| 1,098,299 | Powell | May 26, 1914 |
| 1,423,754 | Clark | July 25, 1922 |
| 1,809,313 | Root | June 9, 1931 |
| 2,059,775 | Clark | Nov. 3, 1936 |
| 2,079,731 | Clark | May 11, 1937 |
| 2,284,530 | Meyer | May 26, 1942 |
| 2,479,580 | Marco | Aug. 23, 1949 |

FOREIGN PATENTS

| | | |
|---|---|---|
| 24,419 | Great Britain | Oct. 25, 1909 |
| 416,954 | France | Aug. 19, 1900 |